(No Model.) 2 Sheets—Sheet 1.

O. ANSCHÜTZ.
PHOTOGRAPHIC CAMERA.

No. 417,131. Patented Dec. 10, 1889.

Attest:
H. S. Knight
Emma Arthur

Inventor
O. Anschütz.
By Knight Bros
Attys.

(No Model.) 2 Sheets—Sheet 2.

O. ANSCHÜTZ.
PHOTOGRAPHIC CAMERA.

No. 417,131. Patented Dec. 10, 1889.

Attest:
H. S. Knight
Emma Arthur

Inventor
O. Anschütz
By Knight Bros
Attys.

UNITED STATES PATENT OFFICE.

OTTOMER ANSCHÜTZ, OF LISSA, NEAR POSEN, PRUSSIA, GERMANY.

PHOTOGRAPHIC CAMERA.

SPECIFICATION forming part of Letters Patent No. 417,131, dated December 10, 1889.

Application filed February 5, 1889. Serial No. 298,744. (No model.)

*To all whom it may concern:*

Be it known that I, OTTOMER ANSCHÜTZ, a subject of the King of Prussia, residing at Lissa, near Posen, Kingdom of Prussia, Germany, have invented new and useful Improvements in Photographic Cameras, whereof the following is a specification.

My invention relates to photographic cameras designed for taking instantaneous photographs; and its object is to provide means for producing photographs of the said kind which are clearer than those heretofore made, and for altering the time of exposure.

Figure 3:
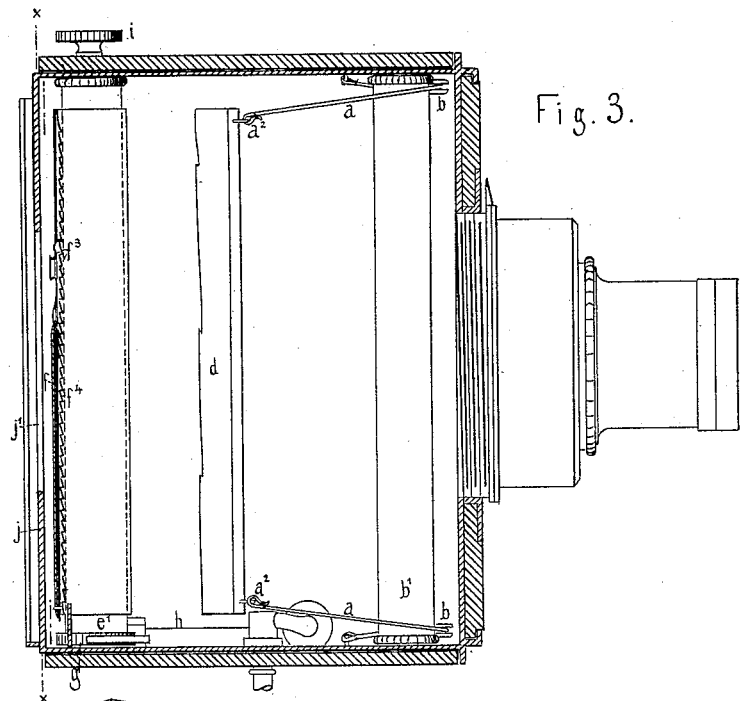
Figure 1:
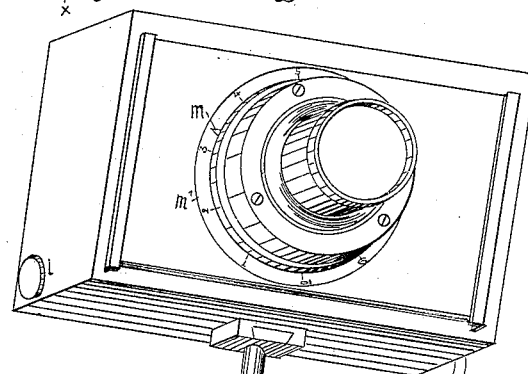
Figure 5:
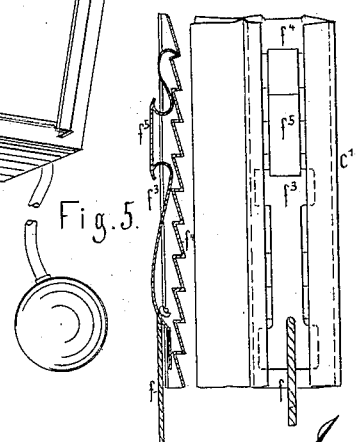
Figure 6:
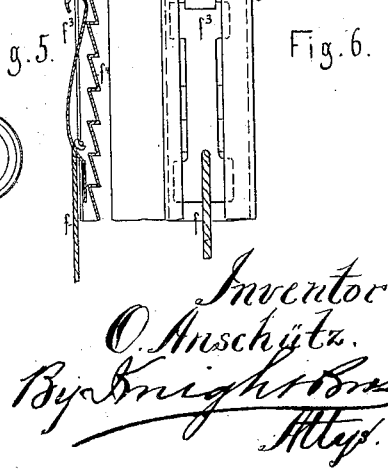
Figure 2:
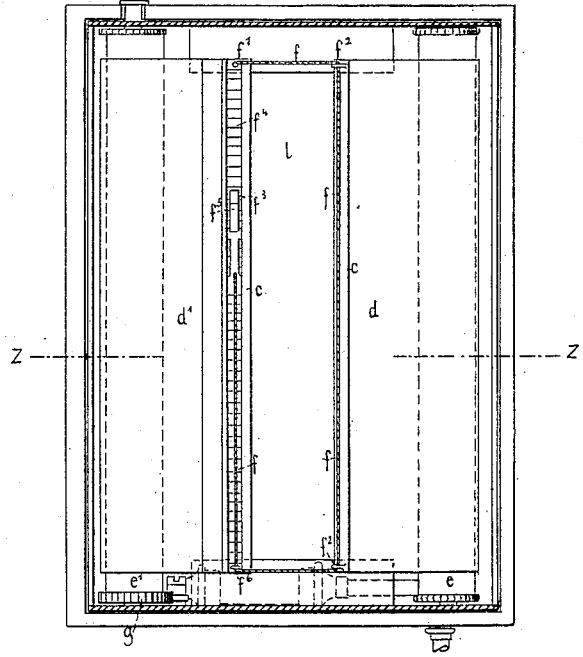

In the annexed drawings, Figure 1 is an outside view of a camera provided with my improvements. Fig. 2 is a transverse section of the camera on line $x\ x$; Fig. 3, a longitudinal section on line $y\ y$, and Fig. 4 a horizontal section on line $z\ z$. Figs. 5 and 6 are respectively a side view and a front elevation of a part in detail, drawn to a larger scale.

For the purpose of increasing the clearness of the photographs, I provide the camera with a shutter having a slit, and so located in the camera as to move with its slitted portion along the rear wall $j$ of the camera—i. e., the wall containing the exposure-opening $j'$.

Figure 4:
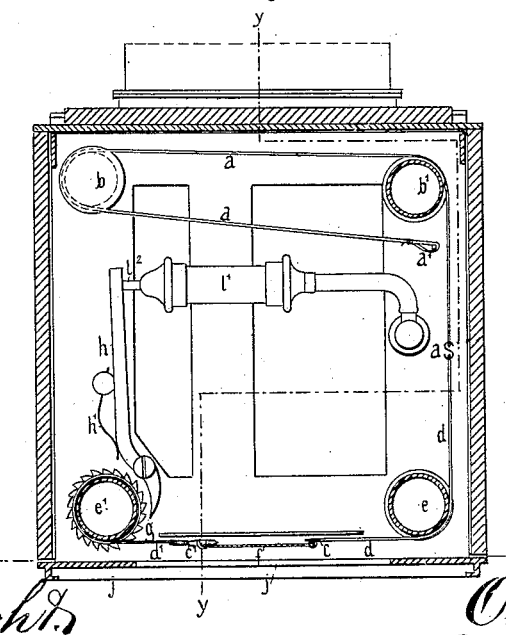

As shown by Figs. 2, 3, and 4, the shutter consists of two pieces of untransparent cloth $d$ and $d'$, connected together by a cord $f$, so as to leave the required slit $l$ between them. The piece $d'$ is fastened with its outer edge to a winding-barrel $e'$, having combined with it a catching and disengaging mechanism, while the piece $d$ runs over a guiding-barrel $e$, and is attached with its outer edge at $a^2$ to india-rubber cords $a$, which are conducted over the barrel $b'$ and the pulleys $b$ to hooks $a'$, to which they are fastened. The said catching and disengaging mechanism consists in the ratchet-wheel $g$, fixed to the barrel $e'$, the pawl $h$, engaging by means of a spring $h'$ with the wheel $g$, the pneumatic cylinder $l'$, having a piston with rod $l^2$, which acts on the pawl $h$, and an india-rubber ball $k$, Fig. 1, connected by a tube to the cylinder $l'$, so that when the ball is compressed the air contained therein will operate to disengage the pawl $h$ from the wheel $g$, the india-rubber cords $a$ then rapidly pulling the shutter, which had previously been wound on the barrel $e'$ by means of the knob $i$, across the exposure-opening $j'$. This mechanism, however, does not in itself form any part of my invention, and it may be replaced by other mechanisms serving for the same purpose.

By means of a shutter such as described, which moves with its slitted part close to the sensitive surface, the said surface is exposed in successive strips to the full action of the rays of light forming the picture, while dispersed rays are excluded therefrom.

For altering the time of exposure, the shutter is provided with an adjusting device whereby the width of the slit $l$ can be varied. The edges of the pieces of cloth $d$ and $d'$ forming the slit are fitted with the respective narrow metal mountings $c\ c'$, whereof the latter constitutes a guide for a resilient sliding pawl $f^3$, (see also Figs. 5 and 6,) arranged to engage with ratchet-teeth $f^4$, formed on the said guide. From the top $f'$ of this mounting a cord $f$ is passed through eyes $f^2$ at the ends of the other mounting $c$, thence through an eye $f^6$ at the bottom of the mounting $c'$, and finally to the pawl $f^3$, to which it is fastened. The cord $f$ thus forms, together with the pawl $f^3$, an adjustable connection between the shutter parts $d\ d'$, whereby the distance between the said parts is reduced when the cord is drawn upon by means of the pawl, (which is for this purpose provided with the projecting part $f^5$,) whereas when the cord is slackened by disengaging the pawl from the ratchet-teeth and shifting it backward the india-rubber cords $a$ cause the said distance to be increased.

I claim as my invention—

1. The combination, with a photographic camera, of a movable shutter composed of two pieces of cloth $d\ d'$, connected adjustably, having between them the slit $l$, substantially as described.

2. The combination, with a photographic camera having the exposure-opening $j'$, of a movable shutter composed of two pieces of cloth $d\ d'$, connected adjustably, having between them the slit $l$, and means for rapidly moving the shutter, the said shutter being so located in the camera as to move with its slitted portion along the wall of the camera containing the exposure-opening, substantially as described.

3. In a photographic camera, the combination, with a shutter composed of two parts forming between them a slit $l$ and movable in respect to each other, of a contrivance for regulating the width of the said slit, consisting in the cord $f$, eyes $f^2 f^6$, rack $f^4$, and pawl $f^3$, substantially as described.

In testimony whereof I have hereunto set my hand in the presence of two subscribing witnesses.

OTTOMER ANSCHÜTZ.

Witnesses:
 B. ROI,
 PH. SACK.